No. 758,356. PATENTED APR. 26, 1904.
A. FRITZ.
DRIVING BELT.
APPLICATION FILED APR. 18, 1902.
NO MODEL.
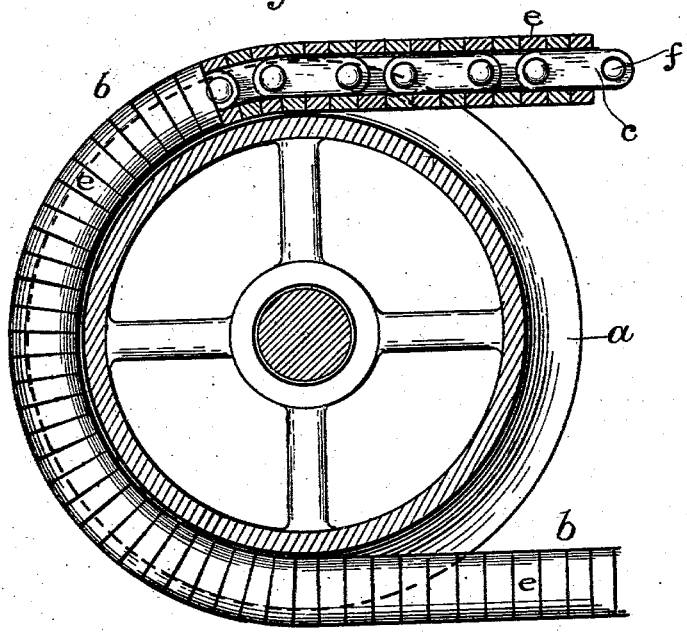
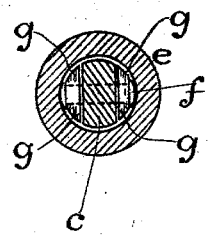
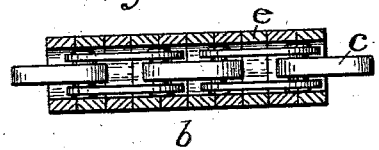
Witnesses:
L. Raphael Geisler
E. M. Howatson
Inventor,
Andy Fritz
by T. J. Geisler
Atty.

No. 758,356.

Patented April 26, 1904.

UNITED STATES PATENT OFFICE.

ANDY FRITZ, OF PORTLAND, OREGON.

DRIVING-BELT.

SPECIFICATION forming part of Letters Patent No. 758,356, dated April 26, 1904.

Application filed April 18, 1902. Serial No. 103,640. (No model.)

*To all whom it may concern:*

Be it known that I, ANDY FRITZ, a citizen of the United States, and a resident of Portland, in the county of Multnomah and State of Oregon, have invented a new and useful Driving-Belt, of which the following is a specification, reference being had to the accompanying drawings as constituting a part thereof.

My invention relates more particularly to driving-belts for cycle-motors; but of course such is not its limitation. Since in motor-cycles the band-wheels by which the power of the engine is transmitted are necessarily of small size, and therefore require the use of a narrow belt, much difficulty and annoyance are constantly encountered because of the belt stretching. This difficulty, however, is not to be overcome by the use of a sprocket-chain transmission, for in such case the transmission of the power would be too positive in its action and obviously would lead to detrimental results. Hence the object of my invention is to obtain a belt which in its power-transmitting features resembles the usual continuous belt made of leather or other suitable material, thus affording a suitable friction-surface and flexibility; but at the same time my belt is to be non-stretchable.

I attain my object by the employment of the devices illustrated in the drawings above referred to.

In the drawings, Figure 1 shows in section one of the grooved band-wheels comprised within the driving mechanism of a motor-cycle and a portion of my improved driving-belt running thereon, said belt being shown partly in section, so as to disclose the interior jointed chain. Fig. 2 shows in perspective one of the perforated disks, of leather or like suitable material, inserted on the chain and incasing the same, as will be hereinafter explained. Fig. 3 shows in plan a portion of the chain $c$ and of the casing $e$ thereof, the latter being shown in section. Fig. 4 is a transverse section of my belt, illustrating a structural feature—namely, rounded outer edges for the members of the chain to prevent the cutting of the inner surface of the casing or covering.

The letters designate the parts referred to.

The particular style of the chain $e$ is immaterial for attaining the object of my invention, the only conditions required of said chain being strength and flexibility, so that it may readily adjust itself to the band-wheel over which the chain is to run. The style of chain shown in Fig. 1 has its advantages in this, that the chain may be readily lengthened or shortened to the length required by simply removing a rivet or rivets $f$ and inserting an additional length of chain or removing the excessive portion of the chain. Furthermore, the same construction facilitates the connection of the two ends of a chain in a perfect manner, so as to render the same absolutely endless.

In its general construction my belt consists of a chain $c$ and a plurality of perforated disks $e$. The latter, as mentioned, may be constructed of leather or any other material now employed or which hereafter may be found suitable for the same purpose. The chain having been made of the required length, the perforated disks $e$ are thereupon strung on the same as would be beads upon a needle and thread until the whole of the chain is completely incased with disks $e$. Thereupon the ends of the chain are united, while doing which those of the disks $e$ covering the ends of the chain are compressed upon each other, so as to be able to insert the rivet $f$ or otherwise effect the union of such ends if another style of chain be used. The incasing disks $e$ of the chain may be circular, as shown in Fig. 2, or triangular in cross-section. Their construction in this respect depends upon the style or form of the peripheral groove of the band-wheel. To place the chain on the rims of the driving and driven band-wheels, of course it would be necessary to move them a little nearer together in the first place, so as to be able to slip the chain into the groove of one wheel after the same has been placed on the groove of the other, and when the chain has been so put in place then the adjustable band-wheel may be drawn back so as to obtain the required or desirable tightness in the transmitting-belt.

From the description of my belt above given it is apparent that it is both a practical and simple device. My belt is perfectly endless, which result in an ordinary belt made of leather or like material is attained with much greater difficulty. The incasing disks $c$ abut closely end to end, and they have unlimited wear, and in case any of such disks should happen to be made of imperfect material, therefore requiring the repair of the belt, such repair may be readily made at very little expense. Besides these advantages, my belt is adapted to transmit the power much more perfectly than the ordinary belt, for when once my belt is adjusted as found desirable it will substantially remain in that condition, thus constituting a perfect means for transmitting the power of the motor, at the same time still allowing that little slip in the power-transmission device which is required in cycle-motor mechanism and devices of like operativeness.

In order to prevent the edges $g$ of the links of the chain from cutting into the interior surface of their casing or covering, such edges are rounded, as illustrated in Fig. 4.

While the drawings show the disks $e$ to be substantially of rectangular form in longitudinal section, yet in practice the inner faces of the disks are soon compressed, so as to leave an intervening space between the inner portions of their abutting faces, thus allowing the belt to freely adapt itself to the circumference of the band-wheel.

Having fully described my invention, now what I claim, and desire to secure by Letters Patent, is—

1. A driving-belt, comprising a jointed link chain, and a continuous friction-covering therefor, consisting of a plurality of perforated disks $e$, made of an elastic material, abutting closely, end to end, and completely incasing the chain, substantially as described.

2. A driving-belt, comprising a jointed link chain, and a continuous friction-covering therefor, consisting of a plurality of perforated disks $e$, made of an elastic material, abutting closely, end to end, and completely incasing the chain; the outer edges of the chain-links being rounded, to prevent the wear of the eyes of the disks, substantially as described.

3. A driving-belt, comprising a link chain; the links being connected by transverse rivet-pins, so as to facilitate the connecting and adjustment of the chain, as required; and a continuous friction-covering for said chain, consisting of a plurality of perforated disks, made of an elastic material, abutting closely, end to end, and completely incasing the chain, substantially as described.

In testimony whereof I have hereunto affixed my signature, in the presence of two witnesses, this 29th day of March, 1902.

ANDY FRITZ.

Witnesses:
T. J. GEISLER,
E. M. HOWATSON.